United States Patent

Nomura

[11] 4,016,576
[45] Apr. 5, 1977

[54] EXPOSURE VALUE DISPLAY FOR CAMERAS

[75] Inventor: Katsuhiko Nomura, Kawagoe, Japan

[73] Assignee: Asahi Kogaku Kogyo Kabushiki Kaisha, Japan

[22] Filed: July 8, 1975

[21] Appl. No.: 593,974

[30] Foreign Application Priority Data

July 12, 1974 Japan .............. 49-81542

[52] U.S. Cl. .................. 354/55; 354/152; 354/225

[51] Int. Cl.² .................. G03B 17/20

[58] Field of Search ........... 354/53, 54, 55, 56, 354/57, 60 L, 152, 154, 155, 219, 224, 225

[56] References Cited

UNITED STATES PATENTS

| 3,455,225 | 7/1969 | Isshiki | 354/57 |
| 3,882,512 | 5/1975 | Lawrence et al. | 354/109 |
| 3,909,137 | 9/1975 | Kisanuki | 354/60 L |

Primary Examiner—Edna M. O'Connor
Attorney, Agent, or Firm—Steinberg & Blake

[57] ABSTRACT

A system for displaying an exposure value in the viewfinder of a camera or exposure meter. At least part of the light which travels through the objective of the camera is used for determining an exposure value which is displayed in a luminous manner at a location displaced from the viewfinder. A reflector receives light from the luminous exposure value display and reflects this light into the viewfinder while the image of the object which is to be photographed is also reflected into the viewfinder so that the camera operator will see in the field of the viewfinder an image of the luminous exposure value superimposed on an image of the object which is to be photographed.

4 Claims, 2 Drawing Figures

4,016,576

EXPOSURE VALUE DISPLAY FOR CAMERAS

BACKGROUND OF THE INVENTION

The present invention relates to cameras or exposure meter.

In particular, the present invention relates to the display of an exposure value so that the latter can be seen by the operator of the camera in order to enable the operator to provide for proper film exposure.

In cameras, such as single lens reflex cameras, light which has already passed through the objective of the camera is utilized not only for providing in the viewfinder an image of the object which is to be photographed but also for the purpose of measuring light so that a proper exposure will be made. Conventionally with cameras of this type the exposure value displayed in the viewfinder takes the form of an ammeter needle an image of which appears in the viewfinder in connection with a suitable scale. This latter type of display system is particularly disadvantageous in that the exposure value scale remains permanently visible in the viewfinder and thus is disturbing to the eye of the operator. In addition, the ammeter is sensitive to external shocks and is easily placed in the condition where it does not operate properly.

In order to avoid drawbacks of the above type it has already been proposed to display exposure values by utilizing a digital luminescent display element. However, arrangements of this latter type have also proved to be defective for several reasons. First, this type of display requires the digital luminescent display element to display the exposure values either at an edge of the viewfinder or at a position outside of the viewfinder because such a display element or a reflection element used in conjunction therewith casts a shadow on the viewing screen of the viewfinder. A further disadvantage is that this type of display element must be made extremely compact so that it is difficult to manufacture and therefore unavoidably involves a relatively high cost. In addition, the use of such a small display element makes it difficult to observe the displayed value.

SUMMARY OF THE INVENTION

It is accordingly a primary object of the present invention to provide a display system which will avoid the above drawbacks.

In particular, it is an object of the present invention to provide a display arrangement which permits the location of the luminous display value to be freely chosen while at the same time also permitting the size of the digital luminescent display element to be freely selected over a wide range.

A further object of the present invention is to provide a display arrangement of the above type which will enable exposure values to be displayed in the viewfinder without darkening the finder image in any way while at the same time permitting a bright display image of the exposure value to be provided at a relatively large size so that it can easily be viewed without creating any particular difficulty in the focusing operation.

The camera of the invention has an objective means for receiving light from the object which is to be photographed as well as a viewfinder means for providing an image of the object which is to be photographed. A luminous means provides a luminous exposure value. A reflector means is situated with respect to the objective means, the viewfinder means, and the luminous means for reflecting into the viewfinder both an image of the object which is to be photographed as well as an image of the luminous exposure value, so that both of these images are seen in the viewfinder with the exposure value being superimposed upon the image of the object which is to be photographed.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
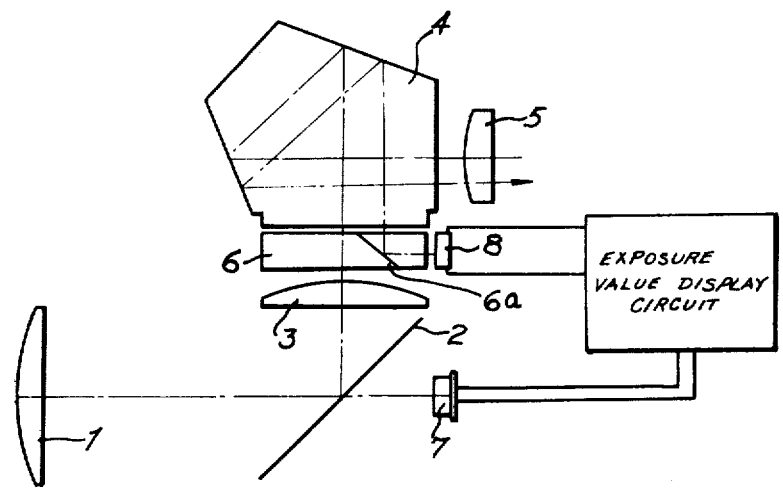
FIG. 1 is a schematic illustration of camera structure which includes the structure of the invention.

In the schematic side elevation view of FIG. 1 which illustrates the optical path for a preferred embodiment of the invention, there is shown an objective means 1 which receives light from the object which is to be photographed. There is also illustrated a pentaprism 4 which together with elements 3 and 5 forms a viewfinder means to provide the camera operator with a view of an image of the object which is to be photographed. The component 3 is a focusing means in the form of a suitable focusing plate for focusing the image which is seen in the viewfinder means while the component 5 is an eyepiece which directs to the eye of the operator the image of the object which is to be photographed.

Also shown in FIG. 1 is a luminous display means 8 for displaying an exposure value in a luminous manner. Thus component 8 forms a luminous display element for displaying exposure values.

A reflector means is provided for reflecting into the viewfinder means not only an image of the object which is to be photographed but also an image of the luminous exposure value provided by the display means 8. This reflector means includes a lower semi-transparent reflector 2 which receives light from the objective 1 and directs the light up through the focusing means 3 into the viewfinder 4 so as to provide in a known way a properly focused image of the object to be photographed this image being seen through the eyepiece 5. The reflector means further includes an upper semi-transparent reflector 6a which receives light from the display means 8 and reflects this light also up into the viewfinder 4 so that through the eyepiece 5 the operator will see not only an image of the object which is to be photographed but also an image of the display value which is provided by the luminous display means 8. The components 2 and 6a are in the form of semi-transparent mirrors. The semi-transparent mirror 6a is carried by a transparent plate 6 positioned as shown in FIG. 1 between the focusing means 3 and the prism 4 of the viewfinder means 3–5. Thus, light which has travelled through the objective means 1 is reflected by the lower semi-transparent reflector 2 up through the focusing means 3 and through the transparent plate 6 the prism 4 so as to provide at the latter the image which is viewed through the eyepiece 5, and it will be noted that part of this light travels directly through the semi-transparent mirror 6a which forms the upper reflector of the invention. On the other hand, this upper semi-transparent reflector will reflect into the viewfinder an image of the exposure value provided by way of the luminous display means 8.

In order to enable the display means 8 to provide a display value part of the light which travels to the semi-transparent lower reflector 2 passes through the latter to be received by a photosensitive means 7. This means 7 is electrically connected as shown schematically in the drawing to an exposure value display circuit which in turn is electrically connected with the luminous display means 8. The exposure value display circuit shown in block form in FIG. 1 is in itself known and is preliminarily adjusted with respect to such factors as the sensitivity of the film. Thus, when a suitable scale on the camera is set in accordance with the speed of the film which is in the camera, a variable resistor of the circuit will be automatically adjusted to take into consideration the film speed. If the display means 8 is designed to display the required diaphragm setting for a given exposure time, then when the operator sets the exposure time there is also an adjustment of a variable resistor to enable the circuit to provide an automatic determination of the required diaphragm setting, and the operator will see the required diaphragm setting in the field of the viewfinder superimposed on the image of the object which is to be photographed so that the operator will know what setting to provide for the diaphragm. On the other hand, the exposure value display circuit may be arranged in such a way as to indicate by way of the display means 8 the required exposure time with the preselected aperture setting being introduced into the exposure value display circuit also by way of a suitable variable resistor. Such expedients are well known. Thus the exposure value display circuit will in response to the light received by the photosensitive means 7 provide at the display means 8 a luminous display of suitable numbers, letters, or combinations thereof to be reflected by the semi-transparent reflector 6a into the field of the viewfinder to be seen simultaneously with the image of the object which is to be photographed.

As is well known, at the instant of exposure the mirror 2 will be swung up beyond the optical axis of the objective means 1, and at this time the photosensitive means 7 can also be moved beyond the path of light traveling from the objective to the film which is to be exposed, such movement of the element 7 being brought about in a known way simultaneously with the upward swinging of the mirror 2.

Figure 2:
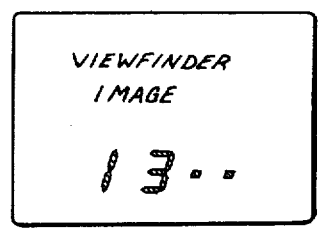
FIG. 2 is an example of what is seen in the viewfinder by the camera operator.

FIG. 2 shows the image which is seen in the viewfinder means. Thus the rectangle in FIG. 2 is the frame in which the operator sees the image of the object which is to be photographed. On this image there is superimposed a display of the exposure value provided by the luminous means 8. Thus, FIG. 2 illustrates a numerical symbol appearing in the field which is viewed in the viewfinder, this numerical symbol being indicative either of a desired aperture setting or of a required exposure time, as set forth above. Thus, when the operator looks into the eyepiece 5 he will see what is indicated in FIG. 2. The light which has travelled through the objective lens 1 is reflected by and in part passed through the semi-transparent mirror 2. The reflected light forms an image at the focusing plate 3 whereas the light which has travelled through the mirror 2 reaches the light-receiving element 7 to operate the exposure value display circuit so as to enable the required exposure value to be displayed in a glowing luminous manner by way of the element 8. The light from the glowing element 8 is reflected by the semi-transparent mirror 6a so as to reach the eyepiece 5 through the pentaprism 4. In this way an exposure value of large size can be clearly viewed in a manner overlapping the finder image.

It is to be noted that the display which overlaps the finder image does not make it difficult to observe the finder image since this display does not darken the finder image in any way. The displayed exposure value is a bright image which is superimposed on the finder image. In this way large-sized display letters and/or figures can be easily viewed without being accompanied by any difficulty in the focusing operation.

Thus, with the invention it is possible to display exposure values in the viewfinder without darkening the finder image in any way. The display position can be freely selected by placing the semi-transparent mirror 6a at any desired position in the transparent plate 6. Furthermore, the display element need not be made of an extremely compact construction. Instead any suitable commercially available digital luminous display element can be utilized to give a display which is readily observable in the viewfiner.

It is of course apparent that the above-described structure also can be used in an exposure meter.

What is claimed is:

1. In a camera, objective means for receiving light from an object which is to be photographed, viewfinder means for providing an image of the object which is to be photographed, luminous display means for displaying a luminous exposure value, and reflector means having with respect to said objective means, said luminous display means, and said viewfinder means a position for reflecting to said viewfinder means both an image of the object which is to be photographed as well as an image of the exposure value provided by said luminous display means, whereby the operator when looking into the viewfinder will see the exposure value superimposed on the image of the object which is to be photographed, said reflector means including a lower reflector situated behind said objective means for reflecting from the latter into said viewfinder means an image of the object which is to be photographed and an upper reflector situated higher than said lower reflector but beneath said viewfinder means with said luminous display means being situated at the same elevation as said upper reflector for directing to the latter light from the luminous exposure value, and said upper reflector directing into said viewfinder means an image of said luminous display value, said upper reflector being situated between said lower reflector and said viewfinder means, a focusing means being situated between said upper and lower reflectors for receiving from said lower reflector an image of the object to be photographed and for focusing said image with respect to said viewfinder means, said upper reflector being situated between said focusing means and said viewfinder means and being in the form of a semi-transparent reflector for reflecting light from said luminous display means as well as for providing for passage of light from said focusing means to said viewfinder means.

2. The combination of claim 1 and wherein said lower reflector also is in the form of a semi-transparent reflector, and photosensitive means situated behind said lower semi-transparent reflector for receiving light which travels through said objective and through said lower reflector, and said photosensitive means being operatively connected with said luminous display means for providing at the latter said exposure value to be received by said upper reflector.

3. The combination of claim 1 and wherein a transparent plate is situated between said focusing means and said viewfinder means and carries said upper reflector.

4. The combination of claim 2 and wherein an exposure value display circuit means is interconnected between said photosensitive means and said luminous display means.

* * * * *